United States Patent
Rolston (10) Patent No.: US 10,384,766 B2
(45) Date of Patent: Aug. 20, 2019

(54) AIRCRAFT WING ROUGHNESS STRIP AND METHOD

(71) Applicant: Airbus Group Limited, London (GB)

(72) Inventor: Stephen Rolston, London (GB)

(73) Assignee: Airbus Operations Limited, Bristol (GB)

( * ) Notice: Subject to any disclaimer, the term of this patent is extended or adjusted under 35 U.S.C. 154(b) by 323 days.

(21) Appl. No.: 15/446,469

(22) Filed: Mar. 1, 2017

(65) Prior Publication Data

US 2017/0253321 A1 Sep. 7, 2017

(30) Foreign Application Priority Data

Mar. 3, 2016 (GB) .................................. 1603723.6

(51) Int. Cl.
*B64C 21/10* (2006.01)
*B64C 3/00* (2006.01)
(Continued)

(52) U.S. Cl.
CPC ................ *B64C 21/10* (2013.01); *B64C 3/00* (2013.01); *B64C 3/10* (2013.01); *B64C 3/26* (2013.01); *B64C 30/00* (2013.01); *B64C 39/024* (2013.01); *B64C 2003/148* (2013.01); *B64C 2003/149* (2013.01); *B64C 2230/08* (2013.01); *Y02T 50/12* (2013.01); *Y02T 50/166* (2013.01)

(58) Field of Classification Search
CPC .. B64C 21/10; B64C 2003/148; Y02T 50/166
See application file for complete search history.

(56) References Cited

U.S. PATENT DOCUMENTS 2,800,291 A * 7/1957 Stephens ................ B62D 35/00
114/67 R
6,334,753 B1 1/2002 Tillman et al.
(Continued)

FOREIGN PATENT DOCUMENTS

| EP | 1 714 869 | 10/2006 |
|---|---|---|
| EP | 2 881 323 | 6/2015 |
| WO | 2006/105174 | 10/2006 |

OTHER PUBLICATIONS

International Search Report cited in GB 1603723.6 completed Aug. 9, 2016, four pages.

*Primary Examiner* — Brian M O'Hara
(74) *Attorney, Agent, or Firm* — Nixon & Vanderhye P.C (57) ABSTRACT

A fixed wing aircraft has a wing with an aerofoil cross-section defining an upper and lower geometric surfaces which meet at a geometric leading edge of the wing. The wing has an upper and lower aerodynamic surfaces while in flight. The upper aerodynamic surface and the lower aerodynamic surface meet at an aerodynamic leading edge at the intersection with an attachment line dividing the air that passes over the upper aerodynamic surface from the air that passes over the lower aerodynamic surface. The lower geometric surface adjacent the geometric leading edge has a roughness strip with a step height of at least 50 microns over the lower geometric surface. The roughness strip is located on the lower aerodynamic surface of the wing when the aircraft is flown at a load factor of 1 g and is located on the upper aerodynamic surface when the load factor is above 1.2 g.

17 Claims, 4 Drawing Sheets

(51) Int. Cl.
  *B64C 3/26* (2006.01)
  *B64C 30/00* (2006.01)
  *B64C 3/10* (2006.01)
  *B64C 39/02* (2006.01)
  *B64C 3/14* (2006.01)

(56) References Cited

U.S. PATENT DOCUMENTS

| | | |
|---|---|---|
| 8,864,078 B2 * | 10/2014 | Barbara ................. B64C 21/10 244/117 A |
| 2009/0090814 A1 | 4/2009 | Barbara et al. |
| 2009/0230251 A1 | 9/2009 | Bonnaud et al. |
| 2017/0137116 A1 * | 5/2017 | Ireland ................... B64C 23/06 |

\* cited by examiner

AIRCRAFT WING ROUGHNESS STRIP AND METHOD

FIELD OF THE INVENTION

The present invention relates to an aircraft with a fixed wing having a roughness strip, and to a method of operating the aircraft.

BACKGROUND OF THE INVENTION

The wings of modern transport aircraft operate in the transonic speed regime. The upper aerodynamic surface has a shock wave that although weak in the 1 g cruise condition (steady level flight) does strengthen with increasing lift (due to, for example, a longitudinal manoeuvre) or increasing speed (for example, a dive). The interaction of the wing upper aerodynamic surface shockwave with the local boundary layer has an impact on the flow separation and flow breakdown which can in turn affect loads and handling qualities. The interaction of a shock wave with a laminar boundary layer can have very different characteristics to that with a turbulent boundary layer. There is a significant performance benefit in designing a wing to have laminar flow on the upper aerodynamic surface. However, for such wings the state of the boundary layer in the region of the shock-boundary layer interaction across all points of the flight envelope and throughout the aircraft service life is unknown. This is because a laminar flow may transition to a turbulent flow due to surface discontinuities (steps) and surface roughness caused by, for example, insect impact residue and aircraft 'wear and tear', the degree of which may change between scheduled maintenance checks.

The aircraft designer wants to know with confidence the state of the boundary layer at the shock-boundary layer interaction at one or more flight conditions which define structural design load limits. Uncertainty can often lead to conservatism in structural sizing with a corresponding increase in aircraft weight, which affects fuel burn and therefore operating costs for the aircraft.

SUMMARY OF THE INVENTION

A first aspect of the invention provides a fixed wing aircraft having a wing with an aerofoil cross-section defining an upper geometric surface and a lower geometric surface which meet at a geometric leading edge of the wing at the intersection with the aerofoil geometric chord, wherein the wing is configured to define an upper aerodynamic surface and a lower aerodynamic surface when the wing is moved through air, wherein the upper aerodynamic surface and the lower aerodynamic surface meet at an aerodynamic leading edge of the wing at the intersection with an attachment line dividing the air that passes over the upper aerodynamic surface from the air that passes over the lower aerodynamic surface, and wherein the lower geometric surface adjacent the geometric leading edge has a roughness strip with a step height of at least 50 microns over the lower geometric surface, the roughness strip is located on the lower aerodynamic surface of the wing when the aircraft is flown at a load factor—the ratio of the lift of the aircraft to its weight—of 1 g, and the roughness strip is located on the upper aerodynamic surface when the aircraft is flown at a load factor of 1.2 g or more.

A further aspect of the invention provides a method of operating a fixed wing aircraft having a wing with an aerofoil cross-section defining an upper geometric surface and a lower geometric surface which meet at a geometric leading edge of the wing at the intersection with the aerofoil geometric chord, and wherein the lower geometric surface adjacent the geometric leading edge has a roughness strip with a step height of at least 50 microns over the lower geometric surface, the method comprising moving the wing through air such that some of the air passes over an upper aerodynamic surface of the wing and some of the air passes over a lower aerodynamic surface of the wing, the upper aerodynamic surface and the lower aerodynamic surface meet at an aerodynamic leading edge of the wing at the intersection with an attachment line dividing the air that passes over the upper aerodynamic surface from the air that passes over the lower aerodynamic surface of the wing, and the roughness strip is located on the lower aerodynamic surface of the wing when the aircraft is flown at a load factor—the ratio of the lift of the aircraft to its weight—of 1 g, and the roughness strip is located on the upper aerodynamic surface when the aircraft is flown at a load factor of 1.2 g or more.

Aerofoil geometry defines the geometric chord as the maximum straight line distance between the geometric leading edge and the geometric trailing edge of the aerofoil at zero incidence (which when used herein refers to the angle of attack relative to the oncoming airflow), i.e. the chord line is horizontal. The upper geometric surface of the wing is the surface extending from the intersection of the chord with the geometric leading edge to the geometric trailing edge above the chord line. The lower geometric surface of the wing is the surface extending from the intersection of the chord with the geometric leading edge to the geometric trailing edge below the chord line.

When the wing is flown through the air the airflow over the wing defines an upper aerodynamic surface and a lower aerodynamic surface, which are distinct from the upper and lower geometric surfaces of the wing. Some of the air passes over the upper aerodynamic surface of the wing and some of the air passes over the lower aerodynamic surface of the wing. The upper aerodynamic surface and the lower aerodynamic surface meet at the leading edge of the wing at the intersection with an attachment line dividing the air that passes over the upper aerodynamic surface from the air that passes over the lower aerodynamic surface of the wing. As the incidence of the wing is changed the geometric upper and lower surfaces remain invariant but the aerodynamic upper and lower surfaces change due to migration of the attachment line around the leading edge of the wing.

The roughness strip is a region of finite width extending generally spanwise adjacent the wing leading edge and having the minimum step height. The roughness strip may be continuous or broken, and may be anything from a near two-dimensional line to a broader stripe. The step height need not be a height above the nominal wing leading edge surface but may be a configured as a groove, so long as the step formed has the defined minimum height to trip the boundary layer to turbulent.

The load factor is defined as the ratio of the lift of an aircraft to its weight. The lift is generated predominantly but not exclusively by the wings, e.g. the fuselage and other flying surfaces of the aircraft also contribute to the lift. It represents, at an aircraft level, the stress or load to which the aircraft is subjected. Whilst strictly speaking dimensionless, the load factor is normally represented in 'g' because of the relationship between the load factor and the apparent acceleration due to gravity felt on board the aircraft. A load factor of 1, or 1 g, refers to steady level flight where the lift of the aircraft equals its weight. The load factor may be positive or negative and results from manoeuvres or wind gusts.

The fuel burned by the aircraft through its mission is largely determined by the drag of the wing of the 1 g lift condition around the cruise altitude. One means to reduce drag is to promote laminar flow over the upper aerodynamic surface of the wing. The weight of the wing structure is determined by the loads away from this 1 g cruise condition, typically (but not exclusively) higher g conditions for commercial jet transport aircraft such as onset of buffet (around 1.2 g or 1.3 g) and avoidance manoeuvers (up to 2.5 g). However, having a laminar boundary layer flow over the upper aerodynamic surface at these higher g conditions might be disadvantageous given the uncertainties associated with shock boundary layer interaction.

At a load factor of 1 g the roughness strip is designed to be located on the lower aerodynamic surface of the wing so that the roughness strip will trip the local boundary layer to turbulent over the lower aerodynamic surface but not over the upper aerodynamic surface. At a load factor of positive 1.2 g or more, the positive incidence (angle of attack) of the wing to achieve this load factor causes the attachment line to migrate around the wing leading edge so that the roughness strip will trip the local boundary layer to turbulent over the upper aerodynamic surface but not over the lower aerodynamic surface. The load factor of 1.2 g has been chosen since this corresponds to the buffet or manoeuvre limited altitude limit at which a specific manoeuvre margin exists prior to buffet onset according to FAA regulations corresponding to a bank angle of 33 degrees. A similar requirement exists in the JAA and CAA regulations for a load factor of 1.3 g corresponding to a bank angle of 40 degrees, and so it may be preferable to set the load factor limit at 1.3 g rather than 1.2 g depending on the applicable regulation.

As the load factor increases above the 1.2 g (or 1.3 g) limit the attachment line will continue to migrate around the wing leading edge but the roughness strip will continue to trip the local boundary layer to turbulent over the upper aerodynamic surface. This ensures that at all other flight conditions above 1.2 g that define structural design load limits, e.g. a 2.5 g manoeuvre or high speed CLmax, the airflow over the upper aerodynamic surface of the wing will be turbulent. This reduces the aerodynamic uncertainty in the aircraft design process and leads to reduced conservatism and therefore reduced structural weight.

At the 1 g load factor there will be a minor detrimental aerodynamic performance effect due to (unnecessarily) tripping the local boundary layer to turbulent over the lower aerodynamic surface but this is more than offset by the beneficial effects noted above.

The roughness strip may be configured to trip a laminar boundary layer upstream of the roughness strip to become a turbulent boundary layer downstream of the roughness strip.

The wing may be a laminar flow wing, or more particularly a natural laminar flow wing. A laminar flow wing typically achieves laminar flow over the upper aerodynamic surface for a greater percentage of the wing chord than does a traditional turbulent wing. Active boundary layer control (e.g. suction devices) may be used to promote laminar flow but natural laminar flow wings achieve this passively. Natural laminar flow wings are designed (mostly by control of camber and leading edge radius) to achieve favourable pressure gradients resulting in significant runs of laminar flow. Laminar flow is typically limited in chordwise extent by shocks or boundary layer flow separation.

Surface roughness will significantly affect the ability to achieve laminar flow. The laminar flow wing may have an upper geometric surface with a surface smoothness, Ra, below 0.5 microns and/or with a maximum step height below 50 microns over at least 30% of the aerofoil chord from the aerodynamic leading edge.

The wing may have a transonic wing configured for cruise flight in the transonic regime. The wing may be swept, either fore or aft, or may be substantially unswept (a straight wing).

The roughness strip may be a linear strip extending in the wing spanwise direction. Alternatively, the roughness strip may be a zigzag strip extending in the wing spanwise direction. Yet further alternatively the roughness strip may be a broken linear strip of discrete roughness sections extending in the wing spanwise direction. Yet further alternatively the roughness strip may be a broken strip of discrete roughness sections extending in the wing spanwise direction, each discrete roughness section extending linearly generally chordwise.

The roughness strip may be a tape or applique attached to the wing. Alternatively the roughness strip may be a paint coat applied to the wing.

The roughness strip may be a joint between wing components configured to create the step height of at least 50 microns. Alternatively, the roughness strip may be a line of fasteners configured to create the step height of at least 50 microns.

The roughness strip may be passive and not active, i.e. it does not move during flight.

The aircraft may be manned or unmanned.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
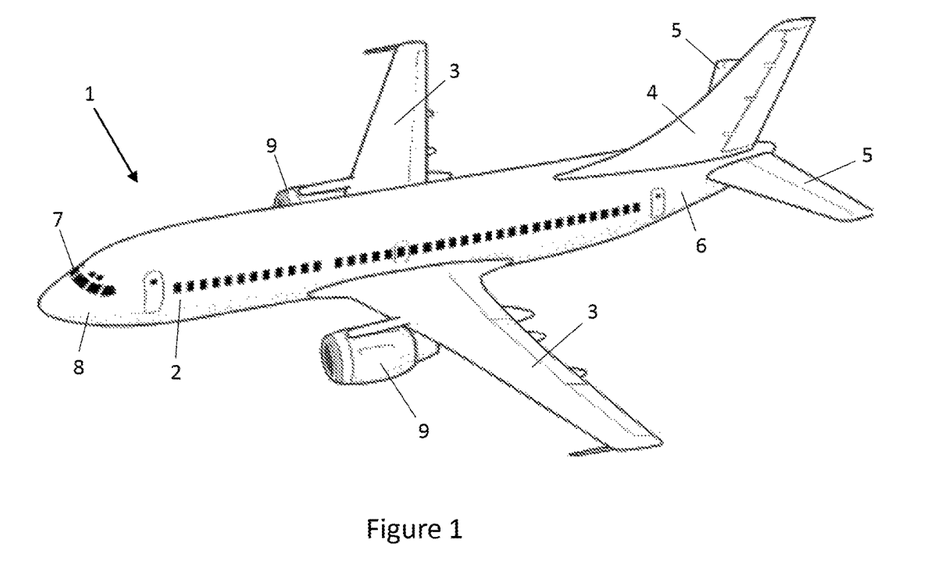
FIG. 1 illustrates a perspective view of a fixed wing aircraft.

FIG. 1 illustrates a fixed wing aircraft 1 having a fuselage 2 and wings 3 fixed with respect to the fuselage 2. Vertical and horizontal stabilizer surfaces 4, 5 are affixed to the aircraft tail 6 whilst the cockpit 7 is located in the aircraft nose 8. The aircraft 1 also has underwing mounted jet engines. The wings 3 are swept aft and the aircraft 1 is a commercial jet transport aircraft configured to fly at transonic speeds in the cruise. It will be appreciated that this invention is not limited to the particular type of fixed wing aircraft shown in FIG. 1 and various other aircraft configurations are envisaged, such as aircraft with alternative wing and stabiliser surface configurations, un-swept or forward swept wings, alternative power plants and power plant configurations, etc.

Figure 2:
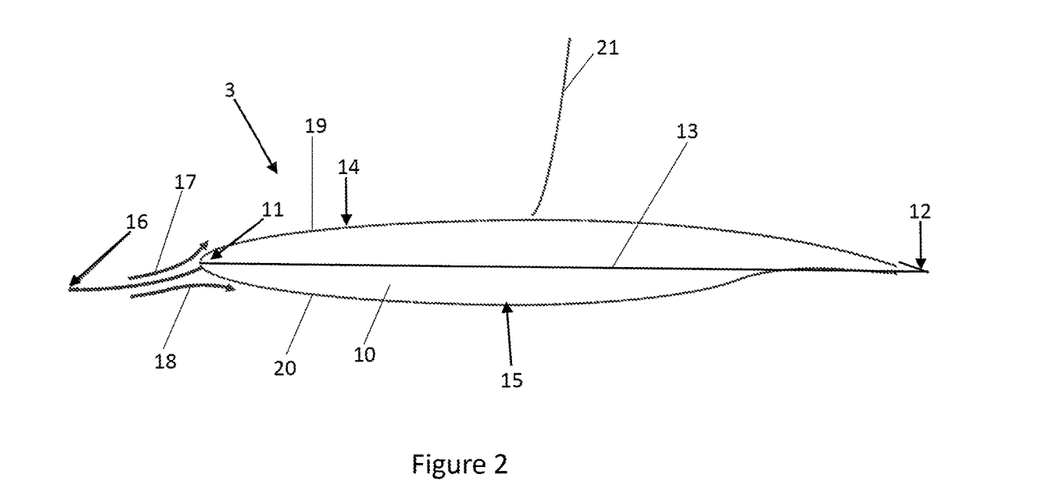
FIG. 2 illustrates a section through the wing of the aircraft showing the aerofoil profile, the upper surface shock formation at transonic speed, and the dividing streamline.

FIG. 2 illustrates a chordwise section through the wing 3 showing the aerofoil profile 10. The wing 3 has a leading edge 11, a trailing edge 12 and the aerofoil profile 10 has a chord 13 extending between the leading edge 11 and the trailing edge 12. The wing 3 in this particular embodiment is a natural laminar flow wing and this is reflected in the aerofoil profile 10 which has a relatively small leading edge radius, the thickest part of the aerofoil occurs at the approximately 50% chord location, and the camber of the wing from the leading edge 11 to the point of maximum camber is more gradual than on a conventional aerofoil. The wing 3 has an upper geometric surface 14 and a lower geometric surface 15, which surfaces 14 and 15 meet at the leading edge 11 and the trailing edge 12 at the intersection with the chord 13.

For the wing 3 in an airstream there is a streamline 16 above which the flow 17 travels over the upper aerodynamic surface 19 of the aerofoil and below which the flow 18 travels over the lower aerodynamic surface 20. This can be termed the dividing streamline 16 and it terminates at the wing surface at the "stagnation point" for a wing of no sweep or the "attachment line" for a wing with sweep. For the wing section 10 generating lift the stagnation point (or attachment line) lies on the lower geometric surface 15 just behind the most forward part of the aerofoil leading edge 11. The upper aerodynamic surface 19 is therefore subtly distinct from the upper geometric surface 14 of the wing.

Finally, FIG. 2 shows a shockwave 21 which touches down near the upper aerodynamic surface 19 of the wing at a location at roughly 50% chord from the leading edge 11 but may be further aft, e.g. at 60% chord from the leading edge.

Figure 3:
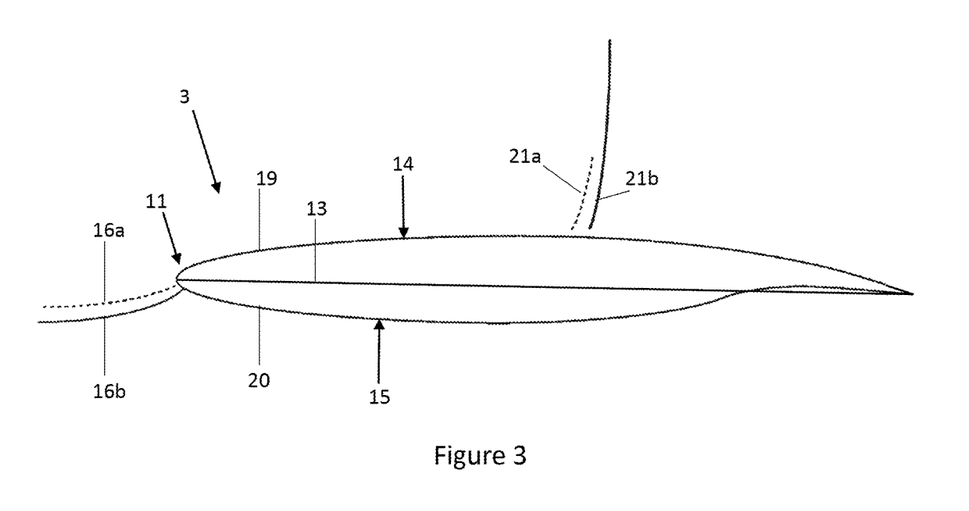
FIG. 3 illustrates the same section through the wing as FIG. 2 and showing aft movement and strengthening of the upper surface shock formation, and aft movement of the dividing streamline over the lower geometric surface at the leading edge, with increasing incidence.

FIG. 3 illustrates the same section through the wing as the section shown in FIG. 2 when the aircraft 1 is subjected to two different load factors. As the lift on the aerofoil is increased through changing its incidence relative to the onset flow the stagnation point (or attachment line) move further downstream along the lower geometric surface 14 near the leading edge 11.

The dotted lines show the dividing streamline 16a and the upper surface shockwave 21a when the aircraft 1 is subjected to a load factor of approximately 1 g. The bold solid lines show the dividing streamline 16b and the upper surface shockwave 21b when the aircraft 1 is subjected to a load factor of approximately 1.2 g. As can be seen from FIG. 3 the attachment of the dividing streamline (where the streamline 16 meets the wing leading edge 11) moves aft over the lower geometric surface 15 of the wing 3 and the upper surface shockwave 21 strengthens and moves aft with the increasing load factor.

Figure 4:
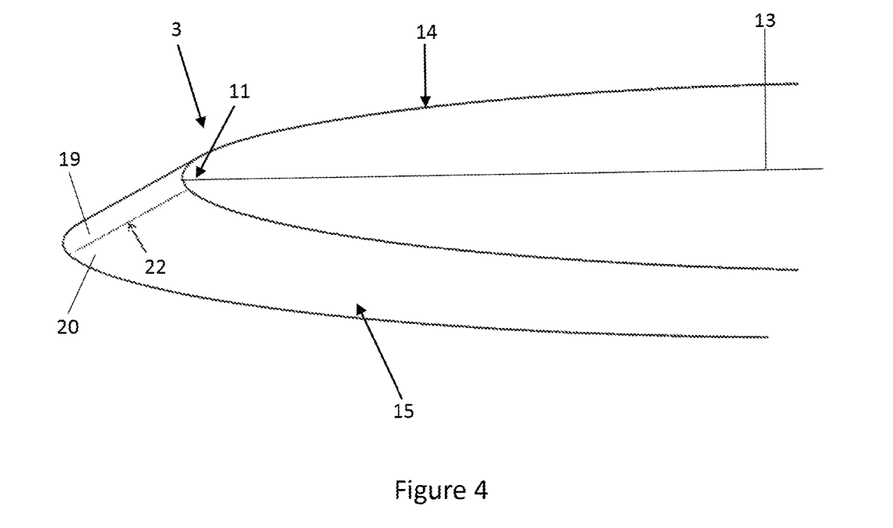
FIG. 4 illustrates the roughness strip according to a first embodiment on the lower geometric surface adjacent the leading edge of the wing.

FIG. 4 illustrates a roughness strip 22 according to a first embodiment on the wing 3 adjacent to the leading edge 11. The roughness strip is located on the lower geometric surface 15. The roughness strip 22 is a narrow, continuous strip extending in the wing span-wise direction across at least a portion of the span of the wing 3. The roughness strip may extend across the full span of the wing, or may extend only across the span of the wing except near the wing root and the wing tip, or it may extend across only selected parts of the wing span as desired.

The roughness strip 22 has a surface roughness with a step height of at least 50 microns over the wing lower geometric surface 15. The step height of at least 50 microns is sufficient (at typical aircraft cruise altitudes of approximately 35,000-38,000 feet and at transonic speeds of approximately Mach 0.85-0.90) to cause the local boundary layer to trip from laminar to turbulent.

The roughness strip 22 can be realised as a line of tape or paint that is fixed to the smooth wing surface and having a strip thickness (height) sufficient to cause a step that can cause transition (i.e. a step height of approximately 50-150 microns). The step may be formed at the edges of the tape or within the tape itself. Alternatively the tape or paint might have a sandpaper type roughness on the surface that is sufficient to cause transition. The step height of at least 50 microns may be a step between discrete sandpaper type grains rather than the tape thickness. The roughness strip 22 could alternatively be realised as the addition of roughness to the finished aircraft surface or a paint layer. The roughness strip need not be a feature in its own right but can be realised through the wing structural concept of a joint where the leading edge skin interfaces with another component. All that is required is that the joint creates the step of height that is sufficient to cause transition (typically 50-150 microns or more).

Figure 5:
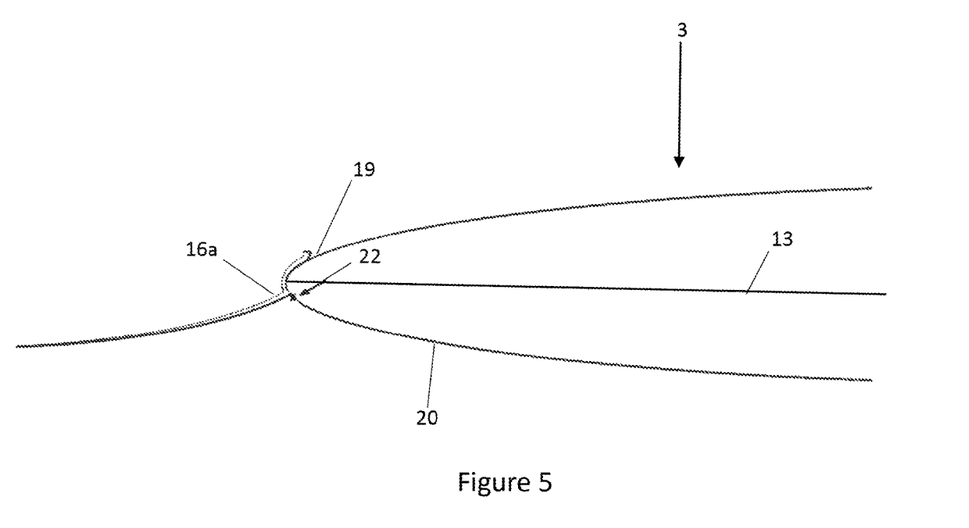
FIG. 5 illustrates a section through the wing of FIG. 4 showing the roughness strip on the lower aerodynamic surface when the aircraft is flown at a load factor of 1 g.

A spanwise roughness strip 22 is positioned on the wing 3 at a chordwise location which is just downstream of the location of the stagnation point (or attachment line) at the 1 g cruise condition, as shown in FIG. 5. Flow over the upper aerodynamic surface 19 is unaffected by the roughness and can therefore be laminar.

Figure 6:
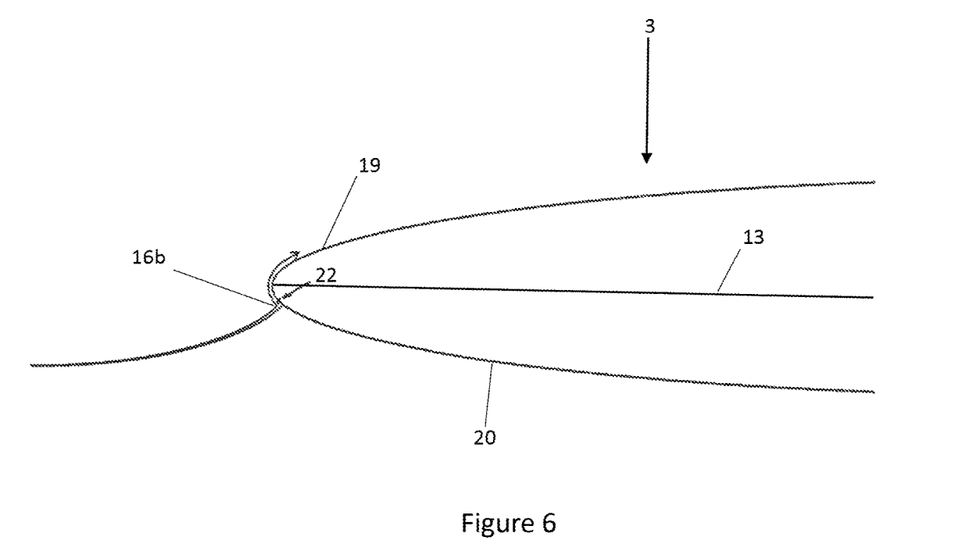
FIG. 6 illustrates the same section as FIG. 6 but showing how the roughness strip appears on the upper aerodynamic surface as the aircraft load factor is increased to 1.2 g.

As lift is increased (increasing load factor) above approximately 1.2 g the stagnation point moves over or even downstream of the roughness strip, as shown in FIG. 6. The roughness strip 22 is sized to cause the flow over the upper aerodynamic surface 19 to become turbulent and therefore a turbulent flow is created over the upper aerodynamic surface 19. When the aircraft returns to its 1 g load factor condition the upper surface flow 17 can return to its desired laminar state.

The roughness strip 22 will cause a turbulent flow to occur on the lower surface at 1 g but the lower surface laminar flow is not typically a requirement for large transport aircraft in the cruise condition as lower surface transition will be expected to occur due to the presence of inspection covers, fasteners and high-lift devices.

The roughness strip 22 ensures that the state of the boundary layer at the upper surface shock boundary layer interaction is always turbulent at conditions where the load factor is greater than approximately 1.2 g. Since a laminar shock boundary layer interaction is different to a turbulent one this removes uncertainty in the prediction of the loads experienced by the wing components. This can remove conservatism in the design process. It may also make certification more straightforward as the turbulent shock boundary layer interaction is well understood.

Figure 7:
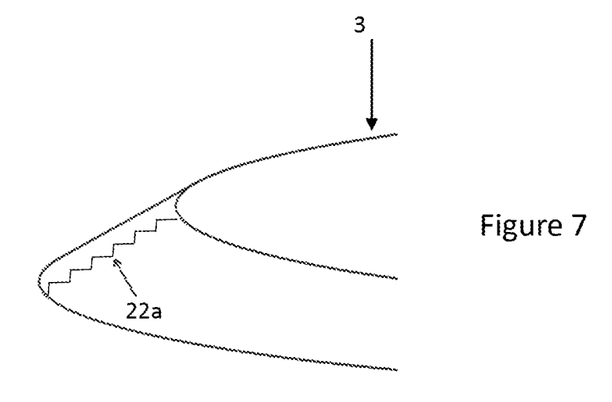
FIG. 7 illustrates a second embodiment of the roughness strip.
Figure 8:
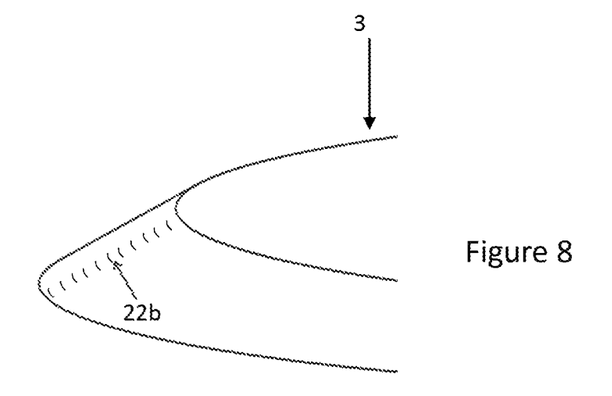
FIG. 8 illustrates a third embodiment of the roughness strip.
Figure 9:
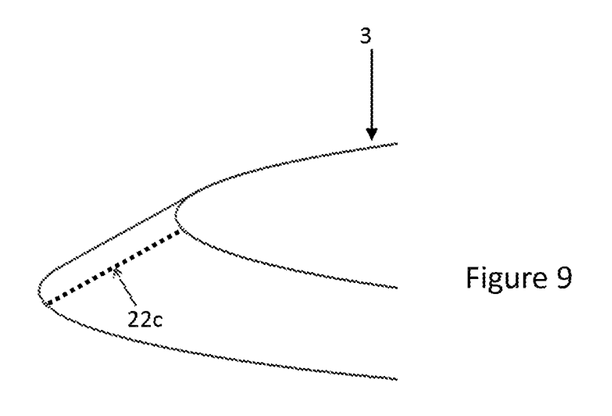
FIG. 9 illustrates a fourth embodiment of the roughness strip.

FIGS. 7 to 9 illustrate alternative second through fourth embodiments of the roughness strip which can be utilised instead of the roughness strip 22 of the first embodiment. The specifics of the roughness strips will now be described although all other features, locations and functions are as described previously.

In FIG. 7, the roughness strip 22a is configured as a continuous zig-zag line of surface roughness of at least 50

μm in height. The zig-zag strip 22a may provide a lower drag solution for the same turbulent effect as compared with the linear roughness strip 22 of the first embodiment.

In FIG. 8, the roughness strip 22b is configured as a spanwise strip of discrete short chordwise extending lines of roughness of at least 50 μm in height. The length of each discrete line of roughness is sufficiently short as to be approximately the same length as the width of the continuous roughness strip 22 of the first embodiment. The roughness strip 22b does not need to be continuous if the wing is swept as the spanwise movement of the air near the attachment line will transmit disturbance due to the lines of roughness from inboard to outboard across the wing span. The discrete lines of roughness will create chordwise extending wedges of turbulence so as to achieve the same turbulent effect but by lowering the forward facing area of the roughness, drag may be reduced as compared with the linear roughness strip 22 of the first embodiment.

In FIG. 9, the roughness strip 22c is configured as a spanwise strip of discrete roughness spots providing a step height of at least 50 microns. The roughness strip 22c does not need to be continuous if the wing is swept as the spanwise movement of the air near the attachment line will transmit disturbance due to the roughness spots from inboard to outboard across the wing span. The discrete spots of roughness will create chordwise extending wedges of turbulence so as to achieve the same turbulent effect but by lowering the forward facing area of the roughness, drag may be reduced as compared with the linear roughness strip 22 of the first embodiment. The discrete roughness spots may alternatively be realised as a line of fasteners with heads proud of the wing surface to create a step height of at least 50 microns. The roughness strip may be configured as a broad spanwise extending stripe that extends from near the leading edge over the entire lower aerodynamic surface of the wing to the wing trailing edge if desired.

The roughness strip of the invention is therefore passive and lightweight and can easily be integrated into the wing and is visible during ground inspection.

Although the invention has been described above with reference to one or more preferred embodiments, it will be appreciated that various changes or modifications may be made without departing from the scope of the invention as defined in the appended claims.

While at least one exemplary embodiment of the present invention(s) is disclosed herein, it should be understood that modifications, substitutions and alternatives may be apparent to one of ordinary skill in the art and can be made without departing from the scope of this disclosure. It is important to note that, while the order or arrangement of the components might be interchangeable, there may be an arrangement or multiple arrangements that are advantaged, as described. This disclosure is intended to cover any adaptations or variations of the exemplary embodiment(s).

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention is:

1. A fixed wing aircraft having a wing with an aerofoil cross-section defining an upper geometric surface and a lower geometric surface which meet at a geometric leading edge of the wing at an intersection with an aerofoil geometric chord,
    wherein the wing is configured to define an upper aerodynamic surface and a lower aerodynamic surface when the wing is moved through air,
    wherein the upper aerodynamic surface and the lower aerodynamic surface meet at an aerodynamic leading edge of the wing at the intersection with an attachment line dividing the air that passes over the upper aerodynamic surface from the air that passes over the lower aerodynamic surface, and
    wherein the lower geometric surface adjacent the geometric leading edge has a roughness strip with a step height of at least 50 microns over the lower geometric surface, the roughness strip is located on the lower aerodynamic surface of the wing when the aircraft is flown at a load factor—the ratio of the lift of the aircraft to its weight—of 1 g, and the roughness strip is located on the upper aerodynamic surface when the aircraft is flown at a load factor of 1.2 g or more.

2. The aircraft according to claim 1, wherein the roughness strip is configured to trip a laminar boundary layer upstream of the roughness strip to become a turbulent boundary layer downstream of the roughness strip.

3. The aircraft according to claim 1, wherein the wing is a laminar flow wing.

4. The aircraft according to claim 3, wherein the upper geometric surface has a surface smoothness, Ra, below 0.5 microns and/or with a maximum step height below 50 microns over at least 30% of the aerofoil chord from the aerodynamic leading edge.

5. The aircraft according to claim 1, wherein the wing is a transonic wing configured for cruise flight in the transonic regime.

6. The aircraft according to claim 1, wherein the wing is swept.

7. The aircraft according to claim 1, wherein the roughness strip is a linear strip extending in the wing spanwise direction.

8. The aircraft according to claim 1, wherein the roughness strip is a zigzag strip extending in the wing spanwise direction.

9. The aircraft according to claim 1, wherein the roughness strip is a broken linear strip of discrete roughness sections extending in the wing spanwise direction.

10. The aircraft according to claim 1, wherein the roughness strip is a broken strip of discrete roughness sections extending in the wing spanwise direction, each discrete roughness section extending linearly generally chordwise.

11. The aircraft according to claim 1, wherein the roughness strip is a tape attached to the wing.

12. The aircraft according to claim 1, wherein the roughness strip is paint coat applied to the wing.

13. The aircraft according to claim 1, wherein the roughness strip is a joint between wing components configured to create the step height of at least 50 microns.

14. The aircraft according to claim 1, wherein the roughness strip is a line of fasteners configured to create the step height of at least 50 microns.

15. The aircraft according to claim 1, wherein the roughness strip is passive and not active.

16. The aircraft according to claim 1, wherein the aircraft is unmanned.

17. A method of operating a fixed wing aircraft having a wing with an aerofoil cross-section defining an upper geometric surface and a lower geometric surface which meet at a geometric leading edge of the wing at the intersection with the aerofoil geometric chord, and wherein the lower geometric surface adjacent the geometric leading edge has a roughness strip with a step height of at least 50 microns over the lower geometric surface, the method comprising:

moving the wing through air such that some of the air passes over an upper aerodynamic surface of the wing and some of the air passes over a lower aerodynamic surface of the wing,     wherein the upper aerodynamic surface and the lower aerodynamic surface meet at an aerodynamic leading edge of the wing at the intersection with an attachment line dividing the air that passes over the upper aerodynamic surface from the air that passes over the lower aerodynamic surface of the wing, and     the roughness strip is located on the lower aerodynamic surface of the wing when the aircraft is flown at a load factor—the ratio of the lift of the aircraft to its weight—of 1 g, and the roughness strip is located on the upper aerodynamic surface when the aircraft is flown at a load factor of 1.2 g or more.

\* \* \* \* \*